UNITED STATES PATENT OFFICE.

PHILIP B. HUNT, OF MINNEAPOLIS, MINNESOTA.

PHOSPHORIC-ACID BAKING-POWDER.

SPECIFICATION forming part of Letters Patent No. 654,572, dated July 24, 1900.

Application filed June 21, 1900. Serial No. 21,123. (No specimens.)

*To all whom it may concern:*

Be it known that I, PHILIP B. HUNT, of the city of Minneapolis, county of Hennepin, State of Minnesota, have invented certain new and useful Improvements in Phosphoric-Acid Baking-Powder, of which the following is a specification.

This invention relates to phosphatic baking powders and preparations; and the object of the invention is to provide a baking-powder of the phosphatic order which will possess superior keeping qualities and which will be of a substantially-fixed strength or character.

As is well known to all familiar with the art of baking-powders, such preparations are peculiarly liable to deterioration when exposed to atmospheric influences, and this is markedly the case with all phosphatic baking-powders. Phosphoric-acid baking-powders have all included as a principal ingredient sodium carbonate or bicarbonate. In most instances bicarbonate and the phosphoric-acid material have been in a finely-pulverulent condition, and powders thus constituted have been noted for a far-too-ready solubility in water preparatory to the use of the powder in food and have also been noted for quick decomposition or deterioration when exposed to the atmosphere. This characteristic of phosphatic baking preparations has greatly reduced their commercial value when compared with baking-powders containing a more staple acidifying agent. The foregoing statements are also true of phosphatic baking-powders wherein the phosphoric-acid material has appeared in the form of coarse grains or granules essentially or substantially free from pulverulent phosphatic material, except that such have been somewhat less-quickly perishable than the other phosphatic powders and have in consequence commanded a somewhat-higher price and standing in the market. For powders of the latter class the phosphatic material is prepared by elaborate processes, whereby all fine particles of phosphate are rejected, only uniform large particles or granules being retained in the powder. While this material is more costly than the very-fine phosphate, its use is certainly desirable, as experience shows that powders containing the same hold their leavening strength for longer periods.

The particular object of my invention is to still further guard phosphatic baking-powders against decomposition and increase the keeping qualities thereof. This I accomplish by a physical change in the alkaline constituent of the powder. Acid phosphate is amorphous and is not dense in structure. It has a strong affinity for and is easily attacked by moisture, and in this respect it is detrimental to any powder wherein it is used. On the other hand, sodium carbonate and sodium bicarbonate are of a dense solid character, not particularly deliquescent or hygroscopic. Proceeding from a knowledge of these principal ingredients of phosphatic baking-powders my conception of an enduring baking-powder is a baking-powder wherein the hygroscopic qualities of the acidifying agent are practically ignored and dependence for stability is placed on the alkaline element of the powder, which is so prepared as to counteract the quick absorption of moisture by the phosphatic material and consequent evolution of carbonic-acid gas before the powder is used. While, as before explained, granular phosphate does to a considerable extent deter the loss of leavening power, I have discovered that deterioration and loss of power in such baking-powders is hastened undesirably and unnecessarily by the minute subdivision of the alkaline carbonate or bicarbonate, such as sodium bicarbonate. The very fineness of this material renders it almost as easily permeable and soluble by moisture as is the amorphous phosphatic element of the powder. Opposed to this condition in all phosphatic powders hitherto suggested I have discovered that by employing only coarse and large grains or crystals of sodium carbonate or bicarbonate in place of the usual fine product and in admixture with granular phosphate I obtain a baking-powder which is practically indestructible by exposure to the atmosphere, even though after long exposure the phosphatic material becomes quite-thoroughly saturated with moisture.

My invention therefore consists in a baking powder or preparation comprising sodium carbonate or bicarbonate in a coarsely-granulated condition in admixture with granular phosphatic material and a suitable diluent or diluents, the mixture being essentially free from pulverulent phosphatic material. The granules of alkaline material may correspond in size to the granules of acid material usually employed and known as "special or granular phosphate;" but I have employed even coarser granules or crystals of sodium carbonate and bicarbonate.

The increased stability of my baking-powder is accounted for by the increased density of the body of sodium carbonate or bicarbonate taken as a whole as present in a given quantity of the powder; also, by the large reduction in extent of the surface of the carbonate or bicarbonate exposed to moisture; also, in the reduction of the number of points of contact between the alkaline and acid elements of the powder, and, finally, by the protection of the granules or crystals of bicarbonate by the fine or pulverulent diluent which practically covers the surfaces thereof. Experiments have proven that my baking-powder retains almost all of its initial leavening power even after long periods of exposure to the atmosphere, and have also proven that my baking-powder does not readily cake or become solid in the cans wherein it is packed, and, further, that when my baking-powder is moistened preparatory to use in bread sufficient gas is evolved for the dough, while the mixture thereafter retains enough leavening strength to thoroughly lighten the bread after it is placed in the oven.

Having thus described my invention, I claim as new and desire to secure by Letters Patent—

1. A phosphoric-acid baking powder or preparation containing an alkaline carbonate or bicarbonate in granular condition admixed with phosphatic material, also in granular condition, and essentially free from pulverulent phosphatic material.

2. A baking powder or preparation containing sodium carbonate or bicarbonate in coarse grains or granules, admixed with special or granular acid phosphate in a like condition and essentially free from pulverulent phosphatic material.

3. A baking-powder comprising acid and alkaline materials in a condition of coarse grains or granules essentially free from pulverulent alkaline or acid materials, and a suitable pulverulent diluent or diluents.

In testimony whereof I have hereunto set my hand this 12th day of June, 1900, at Minneapolis, Minnesota.

PHILIP B. HUNT.

In presence of—
C. G. HAWLEY,
M. E. GOOLEY.